United States Patent
Ayyappan et al.

(10) Patent No.: US 12,423,596 B2
(45) Date of Patent: Sep. 23, 2025

(54) THROUGHPUT BASED SIZING FOR HIVE DEPLOYMENT

(71) Applicant: Kyndryl, Inc., New York, NY (US)

(72) Inventors: Anand Ayyappan, Mumbai (IN); Shapur Wadia, Mumbai (IN); Shalaka Verma, Mumbai (IN); Seema Nagar, Bangalore (IN); Kuntal Dey, New Delhi (IN); Sanjeev Kumar, Pune (IN); Jayrama Sarma Praturi, Andhra Pradesh (IN)

(73) Assignee: Kyndryl, Inc., New York, NY (US)

( * ) Notice: Subject to any disclaimer, the term of this patent is extended or adjusted under 35 U.S.C. 154(b) by 910 days.

(21) Appl. No.: 16/918,540

(22) Filed: Jul. 1, 2020

(65) Prior Publication Data

US 2022/0004895 A1    Jan. 6, 2022

(51) Int. Cl.
*G06N 5/04* (2023.01)
*G06F 11/30* (2006.01)
*G06F 11/34* (2006.01)
*G06N 20/00* (2019.01)

(52) U.S. Cl.
CPC ............ *G06N 5/04* (2013.01); *G06F 11/302* (2013.01); *G06F 11/3495* (2013.01); *G06N 20/00* (2019.01)

(58) Field of Classification Search
CPC . G06N 5/04; G06N 20/00; G06N 7/01; G06F 11/302; G06F 11/3495; G06F 11/3419; G06F 11/3476; G06F 11/3442
See application file for complete search history.

(56) References Cited

U.S. PATENT DOCUMENTS

| | | | |
|---|---|---|---|
| 9,367,601 B2 | 6/2016 | Babu et al. | |
| 2014/0026147 A1* | 1/2014 | Cherkasova | G06F 9/505 718/105 |
| 2017/0169336 A1* | 6/2017 | Singhal | G06F 16/9024 |
| 2017/0213257 A1 | 7/2017 | Murugesan et al. | |
| 2021/0004357 A1* | 1/2021 | Bagchi | G06F 16/25 |
| 2021/0342197 A1* | 11/2021 | Srinivasan | G06F 9/505 |

OTHER PUBLICATIONS

Herodotou et al., No. One (Cluster) Size Fits All: Automatic Cluster Sizing for Data-intensive Analytics, SOCC '11, Oct. 27-28, 2011, ACM 2011, 14 pages (Year: 2011).*

(Continued)

*Primary Examiner* — Daniel T Pellett
(74) *Attorney, Agent, or Firm* — Erik Swanson; Andrew M. Calderon; Calderon Safran & Wright P.C.

(57) ABSTRACT

A data performance measurement of a computer system is measured. A future value of the data performance measurement is forecasted by executing a forecasting model. A set of throughput model input parameters is configured. A throughput requirement for the computer system is computed by executing a throughput model using the set of throughput model input parameters and the future value of the data performance measurement. A capacity requirement corresponding to the throughput requirement is determined. A resource within the computer system is deployed according to the capacity requirement.

20 Claims, 9 Drawing Sheets

(56) References Cited

OTHER PUBLICATIONS

Steinbach et al., Apache Hive Configuration Properties, Apache Software Foundation, webpage dated May 5, 2020, retrieval date Jun. 15, 2020 via web.archive.org (http://web.archive.org/web/20200615023545/https://cwiki.apache.org/confluence/display/Hive/Configuration+Properties), 87 pages (Year: 2020).*

Ramdane et al., Partitioning and Bucketing Techniques to Speed Up Query Processing in Spark-SQL, 2018 IEEE 24th International Conference on Parallel and Distributed Systems (ICPADS), Dec. 11-13, 2018, IEEE 2018, pp. 142-151 (Year: 2018).*

Costa et al., Evaluating partitioning and bucketing strategies for Hive-based Big Data Warehousing systems, Journal of Big Data (2019) 6:34, Springer Open 2019, 38 pages (Year: 2019).*

Gupta, Ankit Prakash, Apache Hive Optimization Techniques—2 (https://towardsdatascience.com/apache-hive-optimization-techniques-2-e60b6200eeca), Aug. 13, 2019, 25 pages (Year: 2019).*

Magellan Leads, Magellan Staff, and Collaborators, The Magellan Report on Cloud Computing for Science, U.S. Department of Energy Office of Science, Dec. 2011, 171 pages (Year: 2011).*

* cited by examiner

THROUGHPUT BASED SIZING FOR HIVE DEPLOYMENT

BACKGROUND

The present invention relates generally to a method, system, and computer program product for computer system size requirement determination. More particularly, the present invention relates to a method, system, and computer program product for throughput-based compute and storage node sizing and deployment.

Apache Hadoop is a software library that enables distributed processing of large data sets across clusters of networked-together computer systems, with each cluster providing local computation and storage. Hadoop splits files into large blocks of data and distributes the data and data processing software across computer systems, or nodes, within a cluster. Software executing on a node processes data on the same node. Thus many nodes process data in parallel, improving efficiency and providing fault tolerance if a node or cluster fails or becomes unreachable. Apache Hive is software, built on top of Hadoop, that is designed to enable easy data summarization, ad-hoc querying, and analysis of large datasets in distributed storage. (Apache, Hadoop, and Hive are registered trademarks of The Apache Software Foundation in the United States and other countries.)

Hadoop and Hive are popular because implementations are scalable as datasets grow. For example, one current implementation stores call data records for a telecommunications provider. One call data record represents one subscriber call or data exchange session, and storing such records is required for analytics, billing, and other query purposes. However, because there more than two billion call data records generated per day, the stored dataset is correspondingly large. Hive also supports Structured Query Language (SQL) and gives users options for integrating custom analysis functionality.

Hive data is organized into databases, which include one or more tables. A table is a homogeneous unit of data with one common organization or schema. A table can have one or more partitions. Partitions are storage units, and also allow the user to efficiently identify rows that satisfy a specified criterion, or partition key. Data in each partition can be divided into buckets based on the value of a hash function of some column of the table. It is not necessary for tables to be partitioned or bucketed, but partitions and buckets allow an implementation to prune large quantities of data during query processing, resulting in faster query execution.

A Bloom filter is a probabilistic data structure, within Hive, for use in checking for set membership without actually reading or containing a set of records. Bloom filters have a substantial space advantage over other data structures for representing sets, because they do not actually contain the data within a set. Because of the probabilistic nature of a Bloom filter, false positives (in which a test for an element's presence in the filter returns true but the element is not actually present) are possible but false negatives (in which a test for an element's presence in the filter returns false but the element is actually present) are not possible. The value of the false positive probability for a particular Bloom filter is a configurable parameter, with a lower value increasing the structure's storage space requirement.

Hive data is often stored using the Optimized Row Columnar (ORC) file format. An ORC file contains groups of row data called stripes. Each stripe includes index data, row data, and a stripe footer. The number of bytes in each stripe, number of rows between index entries (the stride), the Bloom filter false positive rate, a compression type, and other table properties are specifiable when a data table is created.

One type of architecture for Hadoop and Hive implementations is a shared-nothing architecture, in which nodes do not share memory or storage and a data request is satisfied by a single node. Another type of architecture for Hadoop and Hive implementations is a shared storage architecture, in which all storage devices in a cluster are accessible from all cluster nodes, via a network. In a shared storage architecture, each processor in a node also has local, unshared, memory.

Sizing for a Hadoop and Hive implementation refers to determining capacity requirements for computing and storage resources, and the network bandwidth needed to connect the computing and storage resources, in order to achieve desired performance metrics. The determined capacity requirements can change over time, in response to changing performance metrics, the actual amount of data stored, the number and type of queries received, and other data properties.

One example of a desired performance metric is query response time, the time taken to respond to a user query regarding stored data. For example, a requirements document might specify that, for a simple query using 1-5 days' worth of data, the query response time must be under five minutes. Similarly, for a medium query using 1-5 days' worth of data, the query response time must be under fifteen minutes, and for a complex query the query response time must be under thirty minutes. The requirements document also defines simple, medium, and complex queries.

SUMMARY

The illustrative embodiments provide a method, system, and computer program product. An embodiment includes a method that measures a data performance measurement of a computer system. An embodiment forecasts, by executing a forecasting model, a future value of the data performance measurement. An embodiment configures a set of throughput model input parameters. An embodiment computes, by executing a throughput model using the set of throughput model input parameters and the future value of the data performance measurement, a throughput requirement for the computer system. An embodiment determines a capacity requirement corresponding to the throughput requirement. An embodiment deploys, according to the capacity requirement, a resource within the computer system An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
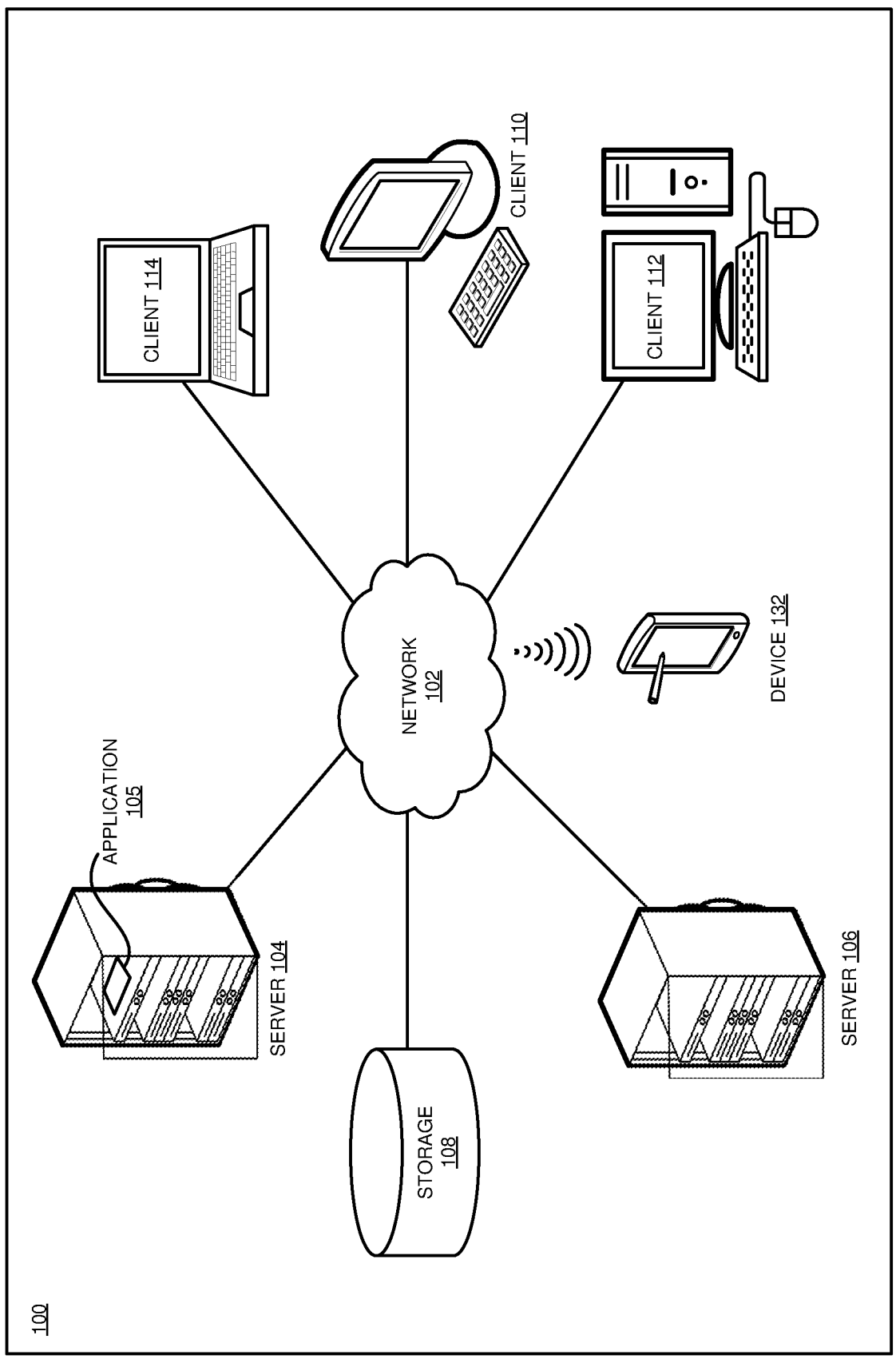
FIG. 1 depicts a block diagram of a network of data processing systems in which illustrative embodiments may be implemented.

The illustrative embodiments recognize that, when planning for a deployment of a new Hive implementation or an update or adjustment of an existing implementation, presently available sizing models compute the number and size of required nodes based on total dataset storage requirements and the amount of storage per node. Because such models are based only on storage requirements, they do not account for scenarios in which data throughput, not storage, is a performance limiter. The number and types of queries to be processed, the effects of different data partitioning, bucketing, and table properties such as defined Bloom filters, the effects of different file formats and compressions, use of a shared nothing or shared storage architecture, and inter-node communication network capabilities all contribute to throughput and determine whether or not a particular implementation meets desired performance metrics. Presently available sizing models do not take such factors into account and do not attempt to compute throughput. Instead, presently available sizing models ask a user to estimate a throughput requirement, then offer general selection guidance using a catalog of preconfigured implementations that are assumed to meet the throughput requirement. Instead, presently available sizing models ask a user to estimate a throughput requirement, then offer general selection guidance using a catalog of preconfigured implementations that are assumed to meet the throughput requirement.

The illustrative embodiments also recognize that presently available sizing models take, as input, total storage requirements for a dataset and the amount of storage per node. Such inputs are often simple extrapolations (e.g. if the dataset grows by two billion records per day, in one month it will hold sixty billion more records) based on ad hoc guesswork. In addition, exploring the effects of different architectures (e.g. the amount of storage per node) often requires a manual process of adjusting model inputs, re-running a model, and evaluating the new results.

Consequently, the illustrative embodiments recognize that there is an unmet need for a Hive implementation sizing model that computes a desired throughput value using performance requirements and architecture specifications, and sizes the implementation based on the computed throughput value. There is also an unmet need for an implementation that generates as many as possible of the performance and architecture requirements from performance metrics, forecasts the generated requirements by analyzing a current implementation, explores the effects of different architectures on the computed throughput, and provides sizing for different architectures to support a human decision-maker's architecture implementation decisions. It is also desirable to actually deploy a Hive implementation according to the generated throughput value and sizing requirements.

The illustrative embodiments recognize that the presently available tools or solutions do not address these needs or provide adequate solutions for these needs. The illustrative embodiments used to describe the invention generally address and solve the above-described problems and other problems related to throughput-based node sizing and deployment.

An embodiment can be implemented as a software application. The application implementing an embodiment can be configured as a modification of an existing Hadoop and Hive management system, as a separate application that operates in conjunction with an existing Hadoop and Hive management system, a standalone application, or some combination thereof.

Particularly, some illustrative embodiments provide a method that measures a data performance measurement of a computer system, forecasts a future value of the performance measurement, configures a set of throughput model input parameters, uses the throughput model to compute a throughput requirement for the system, determines a capacity requirement corresponding to the throughput requirement, and deploys a resource within the system according to the capacity requirement.

An embodiment analyzes data of a computer system that is currently storing data and performing queries on the stored data. In one embodiment, the computer system is an existing Hive implementation for which sizing is being performed to improve performance or determine future resource requirements. In another embodiment, the computer system is not an existing Hive implementation, but the data and query functionality are intended to be migrated to a Hive implementation needing sizing. One embodiment measures or otherwise collects the data from the computer system being analyzed. Another embodiment receives the data via a user interface, by analyzing a requirements document, or from another source other than the computer system being analyzed. Another embodiment measures or otherwise collects a portion of the data from the computer system being analyzed and receives another portion of the data from another source.

The data includes one or more performance measurements. One type of performance measurement measures a characteristic of the data being ingested and stored on the system being analyzed. Some non-limiting examples of this type of performance measurement are a rate at which data comes into the system (i.e. an incoming data rate), a time period during which data must be retained (i.e. a data retention period), a data growth or shrinkage rate, the total size of a dataset, the size of a stride and a record within the dataset, and a compression percentage for the dataset. In addition, some performance measurements are derivable from other performance measurements. For example, one embodiment measures the total size of a dataset, while another embodiments calculates the total size of the dataset from the incoming data rate and the data retention period.

Another type of performance measurement measures a characteristic of a current or contemplated Hive implementation. Some non-limiting examples of characteristics of a Hive implementation are whether or not partitioning and bucketing of data used to respond to queries are on or off, the number of partitions and buckets if on, and the stride size, stripe size, and false positive rate of the implementation's Bloom filters.

Another type of performance measurement measures a characteristic of the queries performed on data stored in the system. One embodiment measures the number of queries performed on data stored in the system during a particular time period, to obtain a query response time or for another purpose. Another embodiment divides the total number of queries according to a set of characteristics of data responsive to a query, for example measuring a number of queries performed on partitioned, bucketed, both partitioned and bucketed, and neither partitioned nor bucketed criteria, and both with and without a Bloom filter index.

An embodiment constructs a time series of a set of performance measurement values, using any presently-available time series construction technique. An embodiment executes a forecasting model on the time series to forecast a future value of the performance measurement and a time associated with the future value. In one embodiment, the forecasting model identifies a growth rate (either positive or negative) in the time series and forecasts the future value according to the growth rate. For example, data stored in one dataset might be growing linearly, while data stored in another dataset might be growing exponentially. In another embodiment, the forecasting model identifies a periodicity and forecasts the future value according to the periodicity. For example, the amount of data in a dataset storing call data records might peak on yearly holidays, such as Mother's Day or New Year's Eve, before returning to a baseline level, and this pattern can be expected to continue. As another example, a dataset storing consumer sales data might grow more rapidly in December, driven by increased holiday shopping, than during a non-holiday period, and this pattern can also be expected to continue. In another embodiment, the forecasting model separates the time series into a growth component and a periodic component and forecasts the future value according to both components. For example, a dataset that is growing linearly but also spikes on New Year's Eve will need additional capacity to accommodate both components.

An embodiment configures a set of throughput model parameters. A throughput model parameter is a performance measurement with a value the embodiment sets instead of measuring. Using performance measurements set to specific values allows an embodiment to explore the effects of different assumptions on the sizing requirements of a contemplated Hive implementation. For example, changing the data retention period from a measured value of one year to a set value of two years changes the amount of storage the Hive implementation will require. As another example, a time required to respond to a query of a specified complexity might be part of a requirements document or other service level agreement the Hive implementation will be required to meet. As another example, changing the size of a stride and a record within the dataset, a compression percentage for the dataset, whether partitioning and bucketing of data are on or off, the number and type of queries, or the false positive rate of the implementation's Bloom filters in a systematic manner allows an embodiment to compute different throughput values for different sets of input parameters and determine the most efficient Hive implementation. Using performance measurements set to specific values also allows an embodiment to size a contemplated Hive implementation based on parameters that may be difficult to measure, or that are expected to change in the future. One embodiment configures a set of throughput model parameters to specific predefined values. Another embodiment configures a set of throughput model parameters according to a set of iteration rules, for example changing the false positive rate of the implementation's Bloom filters in a specific increment.

Both the future value of the data performance measurement and a set of throughput model input parameters are inputs to a throughput model. By executing the throughput model, an embodiment computes a throughput requirement for the Hive implementation being sized.

One embodiment computes a throughput requirement for queries that do not use Bloom filters by computing four throughputs, one each for queries involving only partitioned data, only bucketed data, partitioned and bucketed data, and data that is not partitioned or bucketed, then adds the four throughputs together to obtain a total throughput. In particular, for each type of data, the embodiment computes the amount of data to be queried (in terabytes, denoted by DQ) using the expression $DQ=Q*HDB$, where Q denotes the number of queries on that type of data and HDB denotes the size of the Hive dataset in terabytes. The embodiment also computes the amount of data to be queried considering compression (in terabytes, denoted by DQPC) using the expression $DQPC=DQ*(1-C\%/100)$, where C % denotes a compression expressed as a percentage. The embodiment also computes the data required to be scanned to respond to a query (DS). For queries involving data that is not partitioned or bucketed, $DS=DQPC$. For queries involving only partitioned data, $DS=(DQPC/NP)*WAVQ$, where NP denotes the number of partitions and WAVQ denotes a weighted average of the number of partitions a query runs across. For queries involving only bucketed data, $DS=DQPC/NB$, where NB denotes the number of buckets. For queries involving both partitioned and bucketed data, $DS=(DQPC/NP)*WAVQ/NB$. The embodiment computes the throughput for each type of query using the expression $throughput=(DS*1024)/(T*3600)$, where T denotes a time window in which queries are to be completed expressed in hours and the throughput is expressed in gigabytes per second. Finally, the embodiment adds the throughputs for each type of query together to obtain a total throughput. Other expressions used to compute throughput are also possible and contemplated within the scope of the illustrative embodiments. For example, another embodiment takes as input parameters expressed in different units, computes throughput in different units, or both.

Another embodiment computes a throughput requirement using Bloom filters by computing four throughputs required for reading a Bloom filter, one each for queries involving only partitioned data, only bucketed data, partitioned and bucketed data, and data that is not partitioned or bucketed. The embodiment also computes four throughputs required for reading data, one each for queries involving only partitioned data, only bucketed data, partitioned and bucketed data, and data that is not partitioned or bucketed. The embodiment then adds all eight throughputs together to obtain a total throughput.

In particular, to compute throughputs required for reading a Bloom filter, for each type of data, the embodiment computes the number of strides in the dataset (NST) using the expression NST=size of database*1024*1024*1024*1024/stride size/size of each record, in which the size of the database is in terabytes and stride size and the size of each record are in bytes. The embodiment also computes the Bloom filter size per stride (s, denoted by BFSS, using the expression ceil ((([stride size] *log(FPP)/(2^(log(2))/8), where FPP denotes a probability of false positives, as a real number between 0 and 1, and ceil( ) is a function that rounds its argument to the next highest integer. The embodiment computes a size of the Bloom filter (BFHDS) using the expression BFHDS=NST*BFSS. The embodiment also computes a size of the Bloom filter to be scanned in bytes (QS) using the expression QS=BFHDS*QF, where QF denotes the number of queries on that type of data with Bloom filter indexing. The embodiment also computes the size of the Bloom filter accessed for the query (per day) in bytes (BFAP). For queries involving data that is not partitioned or bucketed, BFAP=QS. For queries involving only partitioned data, BFAP=(QS/NP)*WAVQ, where NP denotes the number of partitions and WAVQ denotes a weighted average of the number of partitions a query runs across. For queries involving only bucketed data, BFAP=(QS/NB), where NB denotes the number of buckets. For queries involving both partitioned and bucketed data, BFAP=QS/WAVQ/NP/NB. The embodiment computes the throughput required for accessing a Bloom filter (IOBF) for each type of query using the expression IOBF=(BFAP*1024)/(T*3600), where T denotes a time window in which queries are to be completed expressed in hours and the throughput required for accessing a Bloom filter is expressed in gigabytes per second.

As well, to compute throughputs required for reading data, an embodiment computes the number of strides that will be read, denoted by NSR. For queries involving data that is not partitioned or bucketed, NSR=NS*BFFP*Q, where NS denotes the number of strides in the dataset, BFFP denotes the Bloom filter false positive rate, and Q denotes the number of queries on that type of data. For queries involving only partitioned data, NSR=NS*BFFP*Q*WAVQ/NP. For queries involving only bucketed data, NSR=NS*BFFP*Q/NB. For queries involving both partitioned and bucketed data, NSR=NS*BFFP*Q*WAVQ/NP/NB. The embodiment computes the size of data to be read (DSR, in terabytes) using the expression DSR=NSR*SS*RS*(1−C %)/(1024*1024*1024*1024), where SS denotes stride size in bytes, RS denotes a record size in bytes, and C % denotes a compression expressed as a percentage. The embodiment computes the throughput required, in gigabytes per second, for reading data (IOD) using (DSR*1024)/(T*3600). Finally, the embodiment adds IOD and IOBF for each type of query together to obtain a total throughput for each type of query, and adds the total throughputs for each type of query together to obtain a total throughput. Other expressions used to compute total throughput including Bloom filtering are also possible and contemplated within the scope of the illustrative embodiments. For example, another embodiment takes as input parameters expressed in different units, computes throughput in different units, or both.

An embodiment adds the throughput requirements computed with and without using Bloom filters to obtain a total throughput requirement. From the total throughput requirement, an embodiment determines a capacity requirement for the Hive implementation being sized. To explore the different effects of using different architectures, one embodiment determines a capacity requirement for both a shared nothing and a shared storage architecture. Another embodiment determines a capacity requirement for one of a shared nothing and a shared storage architecture, as determined by an input performance requirement or data performance measurement on an existing Hive implementation.

For a shared nothing architecture, to determine the number of nodes required, an embodiment determines the throughput of a single node, divides the total throughput requirement, expressed in gigabytes per second, by the throughput of a single node, and rounds up the result. One embodiment determines the throughput of a single node by configuring a node in a configuration that is intended to be used in the Hive implementation and performing a throughput test on the configuration. Another embodiment determines the throughput of a single node by performing the throughput test on multiple configurations, then averaging the results. One embodiment performs four write and four read throughput tests, each with a different combination of buffer size and number of ten-gigabyte files. Another embodiment determines the throughput of a single node using previously computed throughput test results. Another embodiment determines the throughput of a single node using a linear regression based on the configuration, including a number of storage devices, of the single test node. Other methods of determining node throughput, using different test methods, different numbers of test configurations, and different methods of combining the results, are also possible and contemplated within the scope of the illustrative embodiments.

For a shared storage architecture, to determine the number of compute nodes required, an embodiment determines the throughput of a single compute node, divides the total throughput requirement, expressed in gigabytes per second, by the throughput of a single node, and rounds up the result. In addition, an embodiment determines the throughput of a single storage node, divides the total throughput requirement, expressed in gigabytes per second, by the throughput of a single storage node, and rounds up the result. One embodiment determines the throughput of single nodes by configuring nodes in a configuration that is intended to be used in the Hive implementation and performing a throughput test on the configuration. For example, one configuration includes two data servers, a management server, a primary storage unit, and five secondary storage units, all connected by a rack. One embodiment determines the throughput of a single compute node by performing a throughput test on multiple configurations, then averaging the results, reducing the averaged results by an amount intended to factor in overhead, and dividing by the number of compute nodes in the configuration. Some non-limiting examples of multiple configurations include different processor architectures and speeds, different memory sizes, different storage and network adapter capabilities, different dataset sizes, and single and multiple data streams. Another embodiment performs different throughput tests on the multiple configurations. One embodiment determines the throughput of a single storage node by performing a storage throughput test on multiple configurations, then averaging the results, reducing the averaged results by an amount intended to factor in overhead, and dividing by the number of storage nodes in the configuration. One embodiment performs four write and four read throughput tests, each with a different combination of buffer size and number of ten-gigabyte files. Another embodiment determines the throughput of a single compute or storage node using previously computed throughput test results. Another embodiment determines the throughput of a single compute or storage node using a linear regression based on the configuration and test results of the single test node. Other methods of determining compute and storage node throughput, using different test methods, different numbers of test configurations, and different methods of combining the results, are also possible and contemplated within the scope of the illustrative embodiments.

An embodiment deploys a Hive implementation according to the capacity requirement, at the time at which the resources specified in the capacity requirement are forecast to be required. For example, if the capacity requirement was for five compute nodes and three storage nodes in a shared nothing architecture, and a current configuration includes three compute nodes and two storage nodes, an embodiment deploys two additional compute nodes and one additional storage node in a shared nothing architecture. Another embodiment sends instructions to a management system to cause deployment of a Hive implementation according to the capacity requirement. Note that the capacity requirement can also include fewer resources than are used in a current Hive implementation, and at time at which some resources will no longer be required. In this case an embodiment removes, or causes the removal of, the unneeded resources from the Hive implementation when they are no longer required.

The manner of throughput-based node sizing and deployment described herein is unavailable in the presently available methods in the technological field of endeavor pertaining to Hive system management. A method of an embodiment described herein, when implemented to execute on a device or data processing system, comprises substantial advancement of the functionality of that device or data processing system in measuring a data performance measurement of a computer system, forecasting a future value of the performance measurement, configuring a set of throughput model input parameters, using the throughput model to compute a throughput requirement for the system, determining a capacity requirement corresponding to the throughput requirement, and deploying a resource within the system according to the capacity requirement.

The illustrative embodiments are described with respect to certain types of performance measurements, model input parameters, models, architectures, requirements, resources, forecasts, thresholds, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
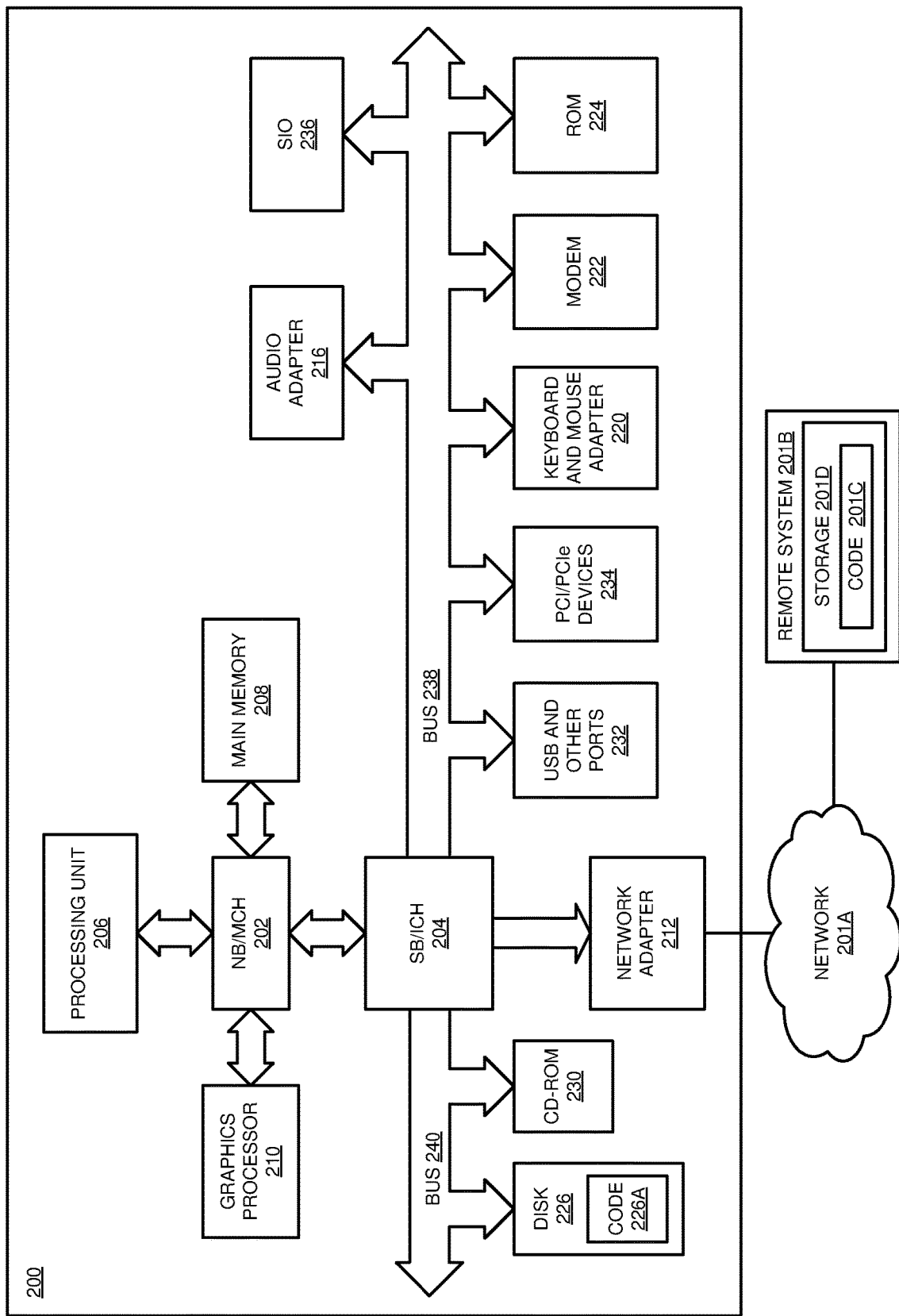
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Any of servers 104 and 106, with or without storage unit 108, are also configurable as a Hive implementation that is the subject of performance measurement and deployment of an updated configuration.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
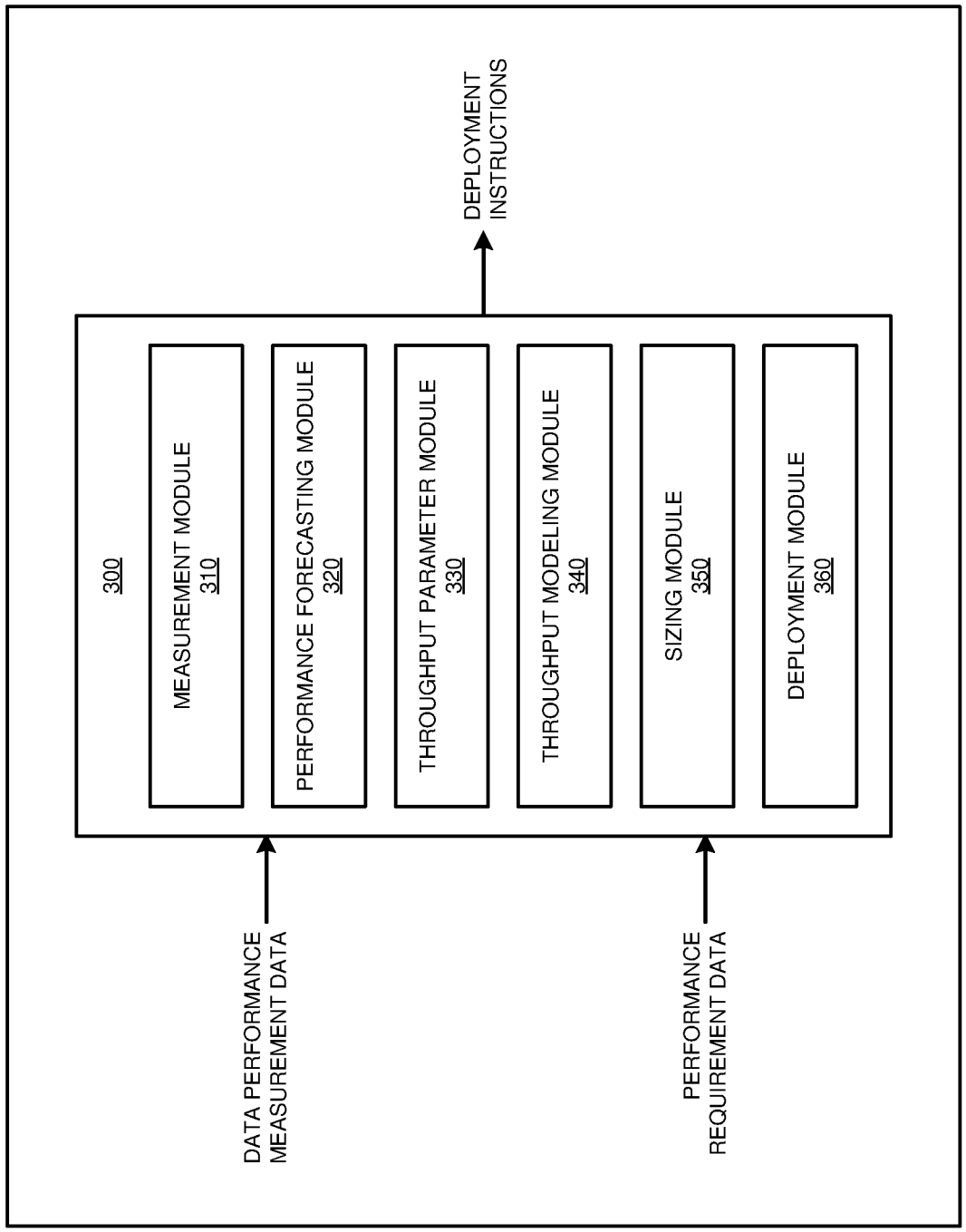
FIG. 3 depicts a block diagram of an example configuration for throughput-based node sizing and deployment in accordance with an illustrative embodiment.

With reference to FIG. 3, this figure depicts a block diagram of an example configuration for throughput-based node sizing and deployment in accordance with an illustrative embodiment. Application 300 is an example of application 105 in FIG. 1 and executes in any of servers 104 and 106, clients 110, 112, and 114, and device 132 in FIG. 1.

Measurement module 310 analyzes data of a computer system that is currently storing data and performing queries on the stored data. Measurement module 310 analyzes data of an existing Hive implementation for which sizing is being performed to improve performance or determine future resource requirements, or another implementation having data and query functionality intended to be migrated to a Hive implementation needing sizing. One implementation of module 310 measures or otherwise collects the data from the computer system. Another implementation of module 310 receives the data via a user interface, by analyzing a requirements document, or from another source. Another implementation of module 310 measures or otherwise collects a portion of the data and receives another portion of the data. The performance measurements include, for example, a rate at which data comes into the system (i.e. an incoming data rate), a time period during which data must be retained (i.e. a data retention period), a data growth or shrinkage rate, the total size of a dataset, the size of a stride and a record within the dataset, a compression percentage for the dataset, whether or not partitioning and bucketing of data are on or off, the number of partitions and buckets if on, the stride size, stripe size, and false positive rate of the implementation's Bloom filters, and the number of queries performed on data stored in the system during a particular time period, either in total or divided according to a set of characteristics of data responsive to a query.

Performance forecasting module 320 constructs a time series of a set of performance measurement values, using any presently-available time series construction technique. Module 320 executes a forecasting model on the time series to forecast a future value of the performance measurement and a time associated with the future value. In one implementation of module 320, the forecasting model identifies a growth rate (either positive or negative) in the time series and forecasts the future value according to the growth rate. In another implementation of module 320, the forecasting model identifies a periodicity and forecasts the future value according to the periodicity. In another implementation of module 320, the forecasting model separates the time series into a growth component and a periodic component and forecasts the future value according to both components.

Throughput parameter module 330 configures a set of throughput model parameters. Using one or more parameters set to specific values allows an embodiment to explore the effects of different assumptions on the sizing requirements of a contemplated Hive implementation. Using specific values also allows an embodiment to size a contemplated Hive implementation based on parameters that may be difficult to measure, or that are expected to change in the future. One implementation of module 330 configures a set of throughput model parameters to specific predefined values. Another implementation of module 330 configures a set of throughput model parameters according to a set of iteration rules, for example changing the false positive rate of the implementation's Bloom filters in a specific increment.

Both the future value of the data performance measurement and a set of throughput model input parameters are inputs to throughput modeling module 340. By executing the throughput model, module 340 computes a throughput requirement for the Hive implementation being sized. One implementation of module 340 computes a throughput requirement for queries that do not use Bloom filters by computing four throughputs, one each for queries involving only partitioned data, only bucketed data, partitioned and bucketed data, and data that is not partitioned or bucketed, then adds the four throughputs together to obtain a total throughput. Another implementation of module 340 computes a throughput requirement for queries that do use Bloom filters by computing four throughputs required for reading a Bloom filter, one each for queries involving only partitioned data, only bucketed data, partitioned and bucketed data, and data that is not partitioned or bucketed. The implementation also computes four throughputs required for reading data, one each for queries involving only partitioned data, only bucketed data, partitioned and bucketed data, and data that is not partitioned or bucketed. The implementation then adds all eight throughputs together to obtain a total throughput.

Module 340 adds the throughput requirements computed with and without using Bloom filters to obtain a total throughput requirement. From the total throughput requirement, sizing module 350 determines a capacity requirement for the Hive implementation being sized. To explore the different effects of using different architectures, one implementation of sizing module 350 determines a capacity requirement for both a shared nothing and a shared storage architecture. Another implementation of sizing module 350 determines a capacity requirement for one of a shared nothing and a shared storage architecture, as determined by an input performance requirement or data performance measurement on an existing Hive implementation.

For a shared nothing architecture, to determine the number of nodes required, module 350 determines the throughput of a single node, divides the total throughput requirement, expressed in gigabytes per second, by the throughput of a single node, and rounds up the result. One implementation of module 350 determines the throughput of a single node by configuring a node in a configuration that is intended to be used in the Hive implementation and performing a throughput test on the configuration. Another implementation of module 350 determines the throughput of a single node by performing the throughput test on multiple configurations, then averaging the results. Another implementation of module 350 determines the throughput of a single node using previously computed throughput test results, or using another method.

For a shared storage architecture, to determine the number of compute nodes required, one implementation of module 350 determines the throughput of a single compute node, divides the total throughput requirement, expressed in gigabytes per second, by the throughput of a single node, and rounds up the result. In addition, the implementation determines the throughput of a single storage node, divides the total throughput requirement, expressed in gigabytes per second, by the throughput of a single storage node, and rounds up the result. One implementation of module 350 determines the throughput of single nodes by configuring nodes in a configuration that is intended to be used in the Hive implementation and performing a throughput test on the configuration. The implementation determines the throughput of a single compute node by performing a throughput test on multiple configurations, then averaging the results, reducing the averaged results by an amount intended to factor in overhead, and dividing by the number of compute nodes in the configuration. The implementation determines the throughput of a single storage node by performing a storage throughput test on multiple configurations, then averaging the results, reducing the averaged results by an amount intended to factor in overhead, and dividing by the number of storage nodes in the configuration.

Deployment module 360 deploys a Hive implementation according to the capacity requirement, at the time at which the resources specified in the capacity requirement are forecast to be required. Another implementation of module 360 sends instructions to a management system to cause deployment of a Hive implementation according to the capacity requirement.

Figure 4:
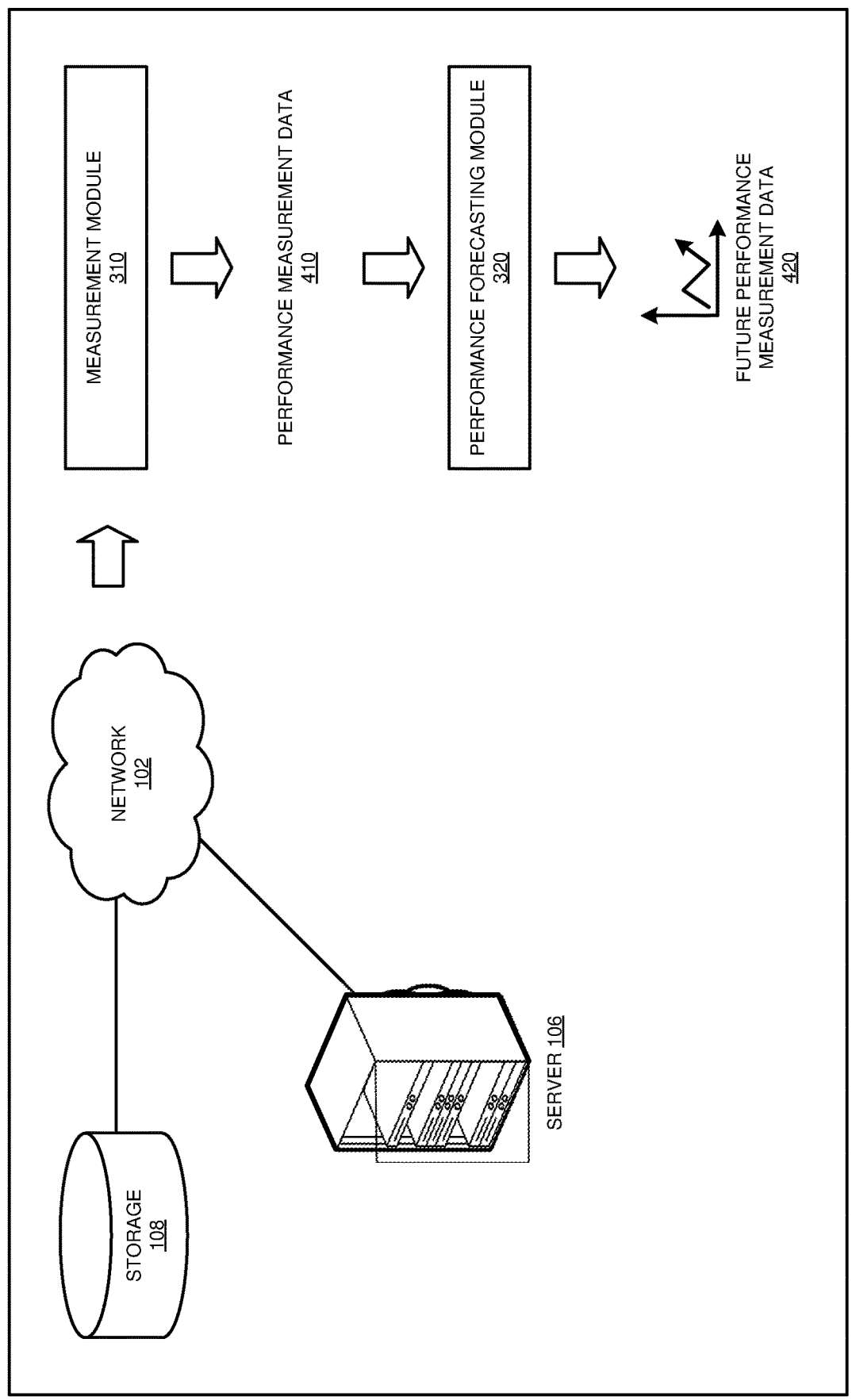
FIG. 4 depicts an example of throughput-based node sizing and deployment in accordance with an illustrative embodiment.

With reference to FIG. 4, this figure depicts an example of throughput-based node sizing and deployment in accordance with an illustrative embodiment. Storage 108, network 102, and server 106 are the same as storage 108, network 102, and server 106 in FIG. 1. Measurement module 310 and performance forecasting module 320 are the same as measurement module 310 and performance forecasting module 320 in FIG. 3.

Measurement module 310 analyzes data of storage 108 and server 106, which are connected via network 102 and currently storing data and performing queries on the stored data. Module 310 generates performance measurement data 410.

Performance forecasting module 320 constructs a time series of data 410, using any presently-available time series construction technique. An embodiment executes a forecasting model on the time series to generate future performance measurement data 420, including a future value of the performance measurement and a time associated with the future value.

Figure 5:
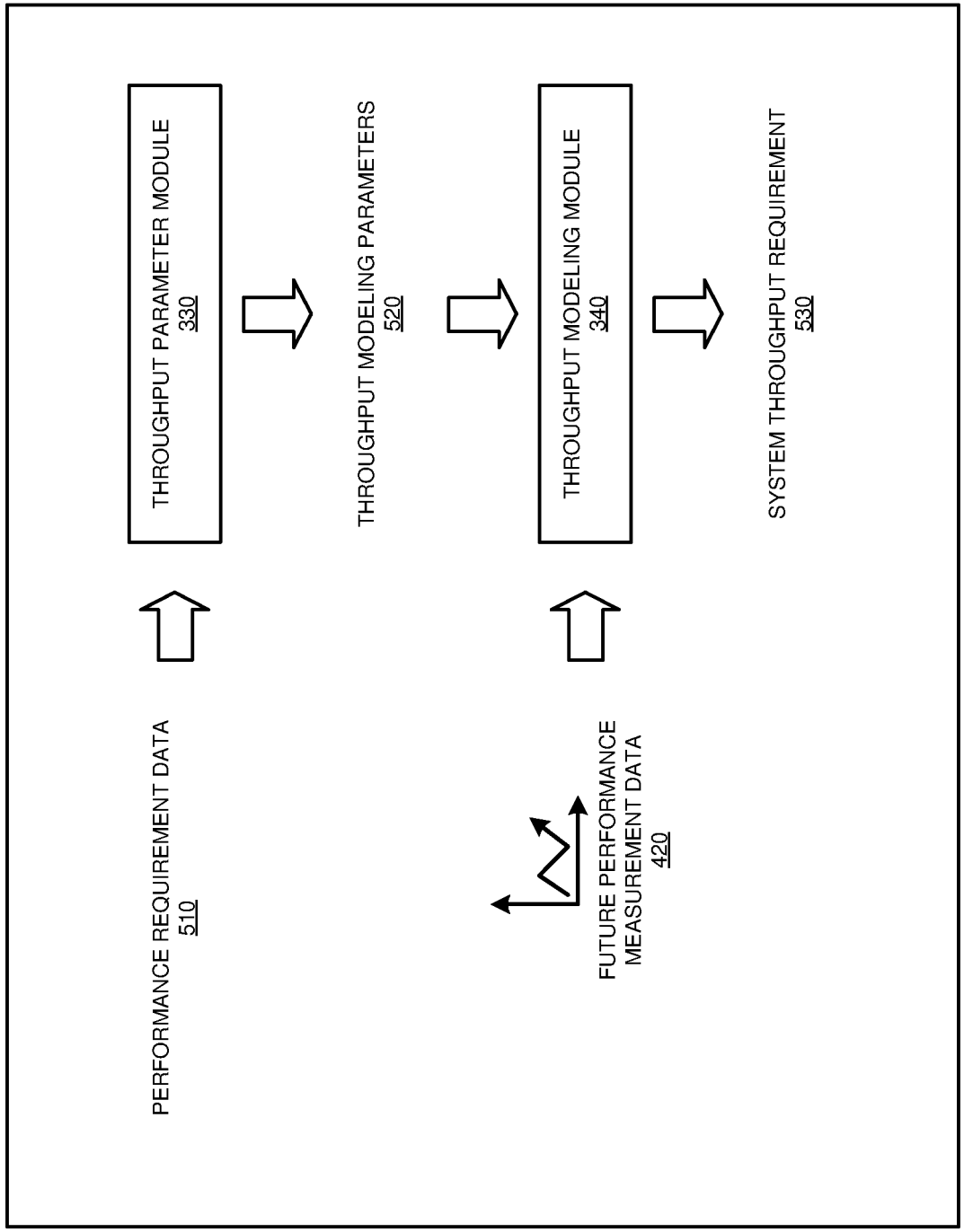
FIG. 5 depicts a continued example of throughput-based node sizing and deployment in accordance with an illustrative embodiment.

With reference to FIG. 5, this figure depicts a continued example of throughput-based node sizing and deployment in accordance with an illustrative embodiment. Throughput parameter module 330 and throughput modeling module 340 are the same as throughput parameter module 330 and throughput modeling module 340 in FIG. 3. Future performance measurement data 420 is the same as future performance measurement data 420 in FIG. 4.

Throughput parameter module 330 receives performance requirement data 510 and configures throughput modeling parameters 520, including one or more performance measurements with values the embodiment sets instead of measuring. Throughput modeling module 340 receives future performance measurement data 420 and throughput modeling parameters 520 and generates system throughput requirement 530.

Module 340 computes a throughput requirement for queries that do not use Bloom filters by computing four throughputs, one each for queries involving only partitioned data, only bucketed data, partitioned and bucketed data, and data that is not partitioned or bucketed, then adds the four throughputs together to obtain a total throughput. For each type of data, module 340 computes the amount of data to be queried (denoted by DQ) using the expression DQ=Q*HDB, where Q denotes the number of queries on that type of data and HDB denotes the size of the Hive dataset in terabytes (TB). For example, if there are 1000 queries of each type per day and the size of the Hive dataset is forecast to be 1560 TB, DQ=1,560,000 TB/day for each type of query. Module 340 computes the amount of data to be queried considering compression (denoted by DQPC) using the expression DQPC=DQ*(1−C %/100), where C % denotes a compression expressed as a percentage. If C %=85%, DQPC=234,000 TB/day for each type of query. Module 340 also computes the data required to be scanned to respond to a query (DS). For queries involving data that is not partitioned or bucketed, DS=DQPC, or 234,000 TB/day. For queries involving only partitioned data, DS=(DQPC/NP)*WAVQ, where NP denotes the number of partitions and WAVQ denotes a weighted average of the number of partitions a query runs across. If NP=395 and WAVQ=84, DS=49,762.03 TB/day. For queries involving only bucketed data, DS=(DQPC/NB), where NB denotes the number of buckets. If NB=100, DS=2,340 TB/day. For queries involving both partitioned and bucketed data, DS=(DQPC/NP)*WAVQ/NB, or 498 TB/day. Module 340 computes the throughput for each type of query using the expression throughput=(DS*1024)/(T*3600), where T denotes a time window in which queries are to be completed expressed in hours and the throughput is expressed in gigabytes (GB) per second. Module 340 adds the throughputs for each type of query together to obtain a total throughput. If T=16 hours, the total throughput for all four types of queries is 5,095 GB/second.

Module 340 also computes throughputs required for reading a Bloom filter and throughputs required for reading data, for each type of data, in a manner described herein. If, for example, NST=1.7 billion, BFSS=7.6 kilobytes (KB), 100 bytes in each record, and a Bloom filter false positive rate of 0.05%, there are 1000 queries of each type with Bloom filter indexing per day, and the queries are targeted to complete in 16 hours, BFHDS=NST*BFSS=12,168 TB/day.

For queries on non-bucketed and non-partitioned data, the size of Bloom filter read is also 12,168 TB/day, IOBF=(BFAP*1024)/(T*3600)=12,000×1024/(16*3600)=216 GB/second, and the data to be read is IOD=(DSR*1024)/(T*3600)=208 GB/second. Thus, the total throughput required for these types of queries is 216+208=424 GB/second.

For queries on partitioned data only, the size of Bloom filter read is also 12,168 TB/day, IOBF=(BFAP*1024)/(T*3600)=2,587×1024/(16*3600)=46 GB/second, and the data to be read is IOD=(DSR*1024)/(T*3600)=44 GB/second. Thus, the total throughput required for these types of queries is 46+44=90 GB/second.

For queries on bucketed data only, the size of Bloom filter read is also 12,168 TB/day, IOBF=(BFAP*1024)/(T*3600)=120×1024/(16*3600)=2.16 GB/second, and the data to be read is IOD=(DSR*1024)/(T*3600)=2.08 GB/second. Thus, the total throughput required for these types of queries is 2.16+2.08=4.24 GB/second.

For queries on bucketed and partitioned data, the size of Bloom filter read is also 12,168 TB/day, IOBF=(BFAP*1024)/(T*3600)=120×1024/(16*3600)=0.46 GB/second, and the data to be read is IOD=(DSR*1024)/(T*3600)=0.44 GB/second. Thus, the total throughput required for these types of queries is 0.46+0.44=0.90 GB/second. Thus, the total throughput requirement for all four types of queries, with Bloom filtering, is 424+90+4.24+0.90=519 GB/second.

Figure 6:
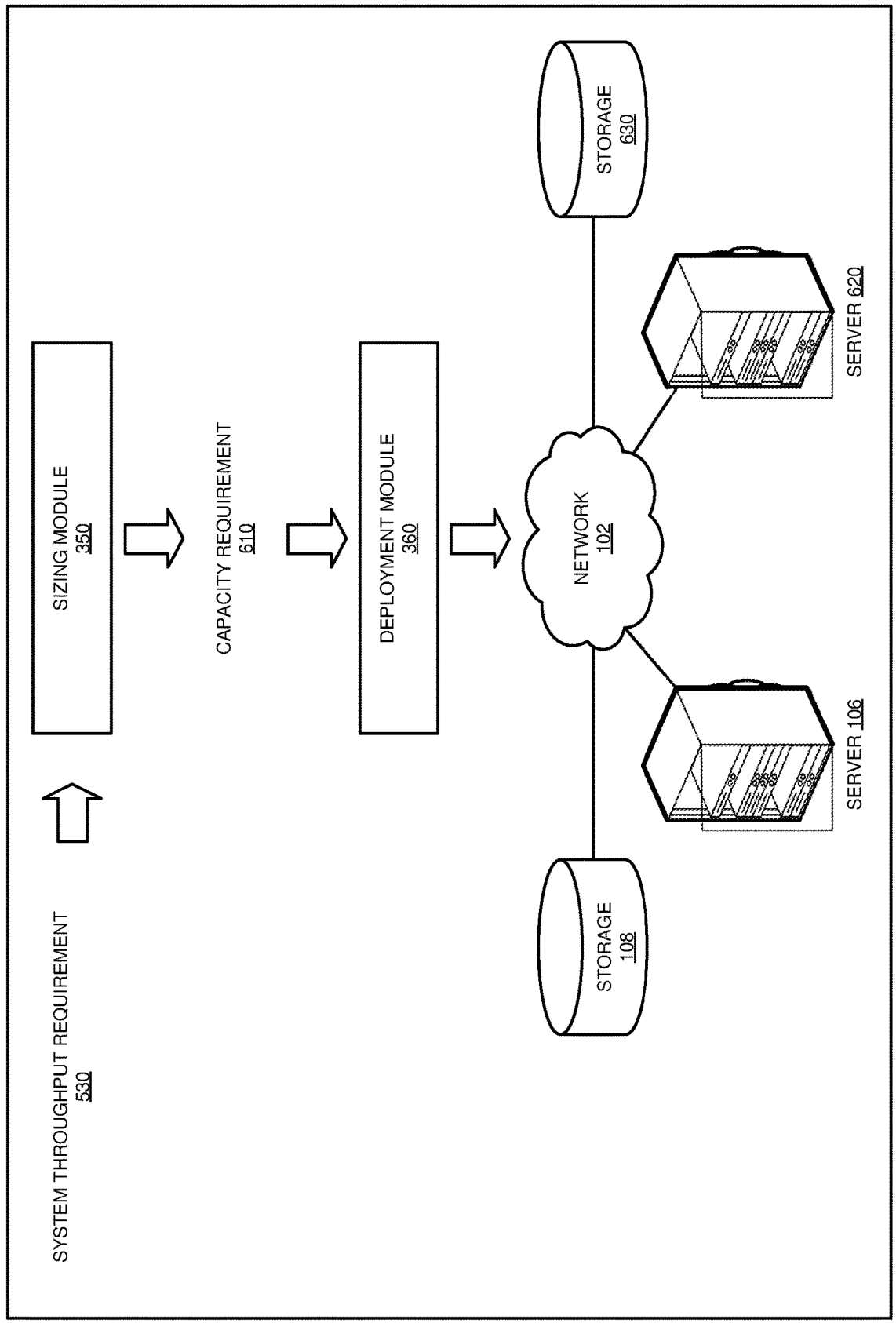
FIG. 6 depicts a continued example of throughput-based node sizing and deployment in accordance with an illustrative embodiment.

With reference to FIG. 6, this figure depicts a continued example of throughput-based node sizing and deployment in accordance with an illustrative embodiment. Storage 108, network 102, and server 106 are the same as storage 108, network 102, and server 106 in FIG. 1. Sizing module 350 and deployment module 360 are the same as sizing module 350 and deployment module 360 in FIG. 3. System throughput requirement 530 is the same as system throughput requirement 530 in FIG. 5.

From system throughput requirement 530, sizing module 350 determines capacity requirement 610 for the Hive implementation being sized. To explore the different effects of using different architectures, one implementation of module 350 determines a capacity requirement for both a shared nothing and a shared storage architecture. Another implementation of module 350 determines a capacity requirement for one of a shared nothing and a shared storage architecture, as determined by an input performance requirement or data performance measurement on an existing Hive implementation.

For example, if total throughput without using Bloom filtering is 5,095 GB/second and total throughput requirement with Bloom filtering is 520 GB/second, the total throughput requirement overall is 5,615 GB/second. A shared storage architecture using nodes with an average throughput of 0.7 GB/second per node on a 10 GB/second network would require 7,563 nodes. A shared nothing architecture using compute nodes with an average throughput of 5.92 GB/second and storage nodes with an average throughput of 25 GB/second would require 949 compute nodes and 225 storage nodes. FIG. 6 depicts these results symbolically, adding server 620 and storage 630 to the devices connected via network 102.

Figure 7:
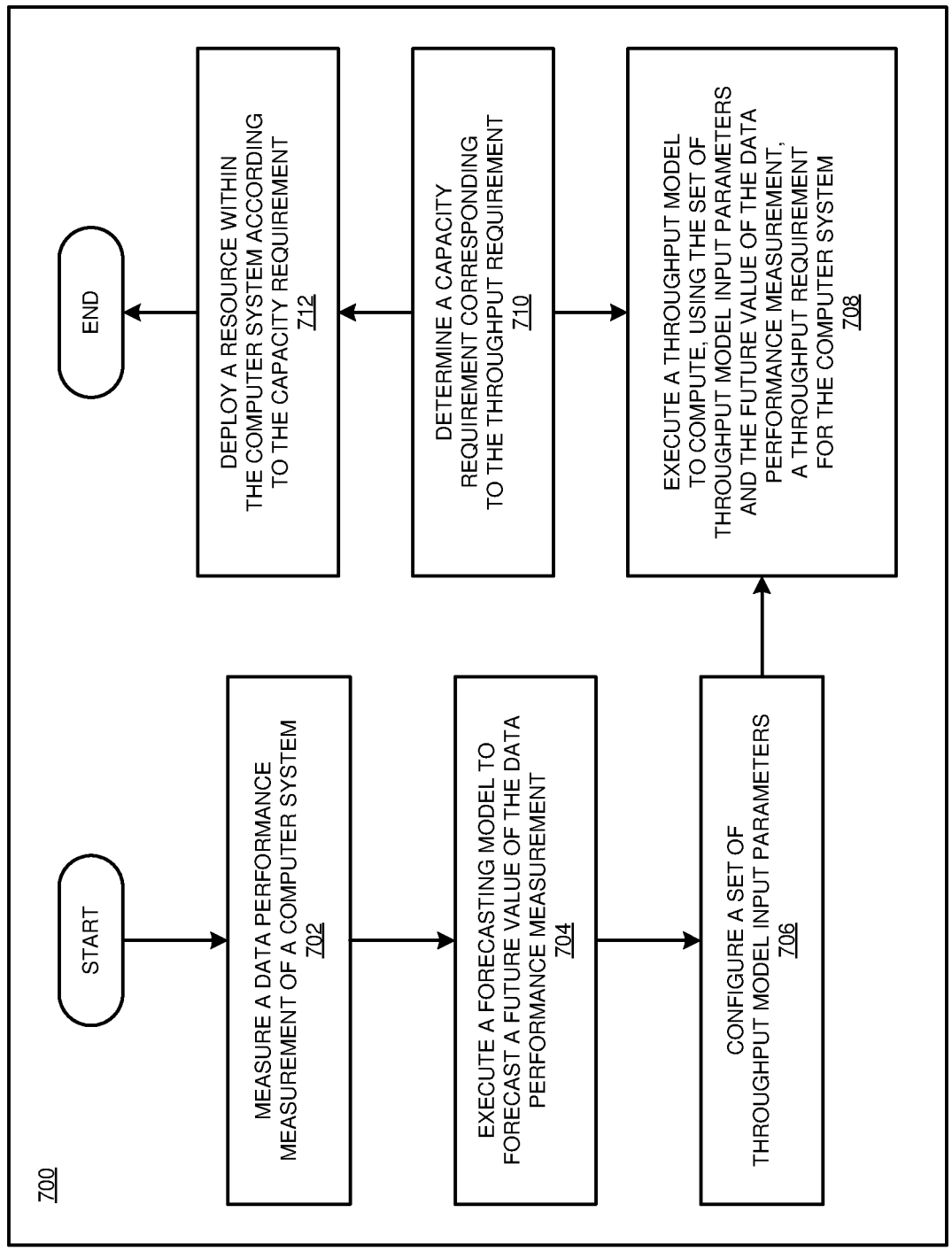
FIG. 7 depicts a flowchart of an example process for throughput-based node sizing and deployment in accordance with an illustrative embodiment.

With reference to FIG. 7, this figure depicts a flowchart of an example process for throughput-based node sizing and deployment in accordance with an illustrative embodiment. Process 700 can be implemented in application 300 in FIG. 3 4.

In block 702, the application measures a data performance measurement of a computer system. In block 704, the application executes a forecasting model to forecast a future value of the data performance measurement. In block 706, the application configures a set of throughput model input parameters. In block 708, the application executes a throughput model to compute, using the set of throughput model input parameters and the future value of the data performance measurement, a throughput requirement for the computer system. In block 710, the application determines a capacity requirement corresponding to the throughput requirement. In block 712, the application deploys a resource within the computer system according to the capacity requirement. Then the application ends.

Figure 8:
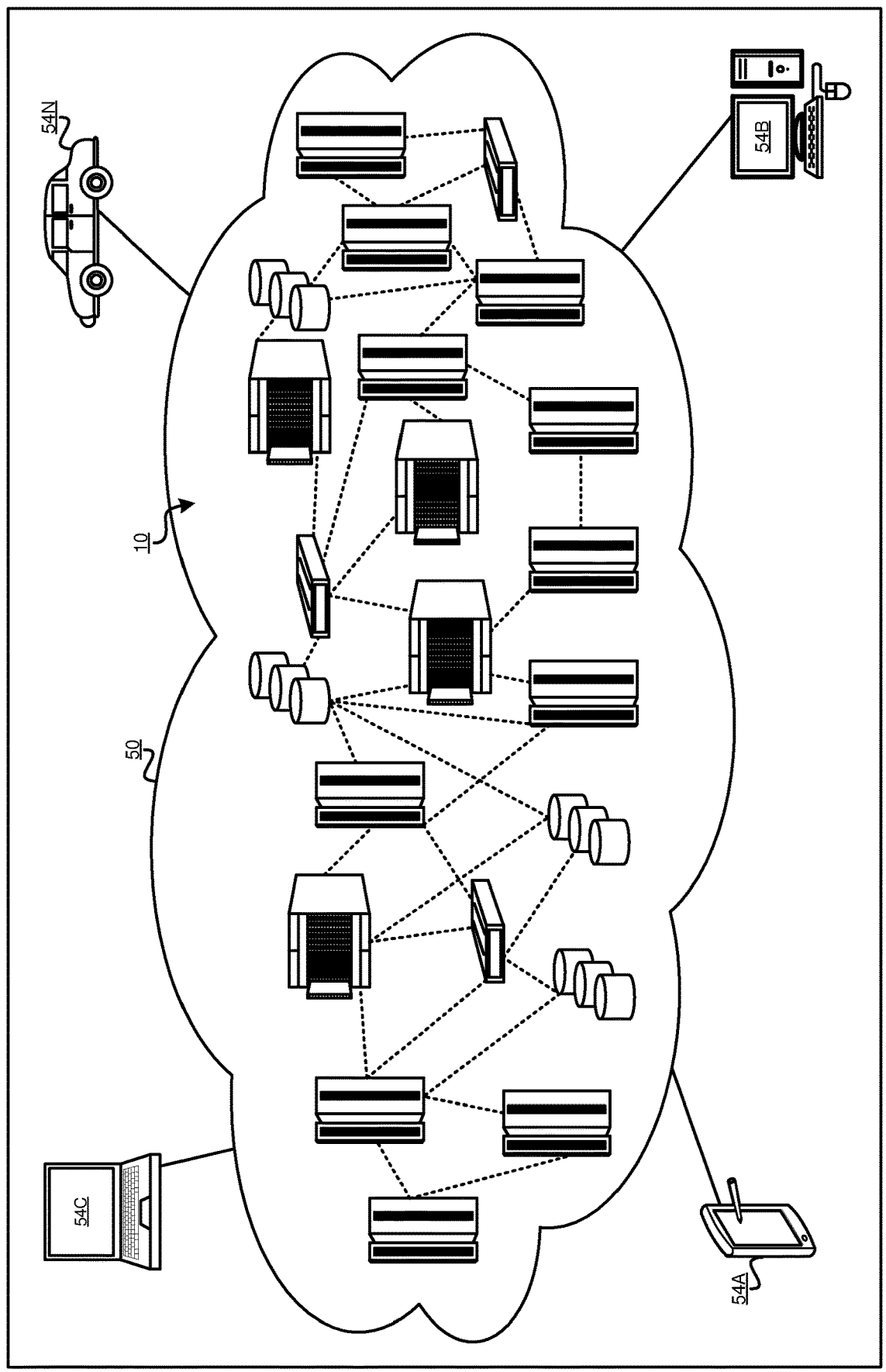
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
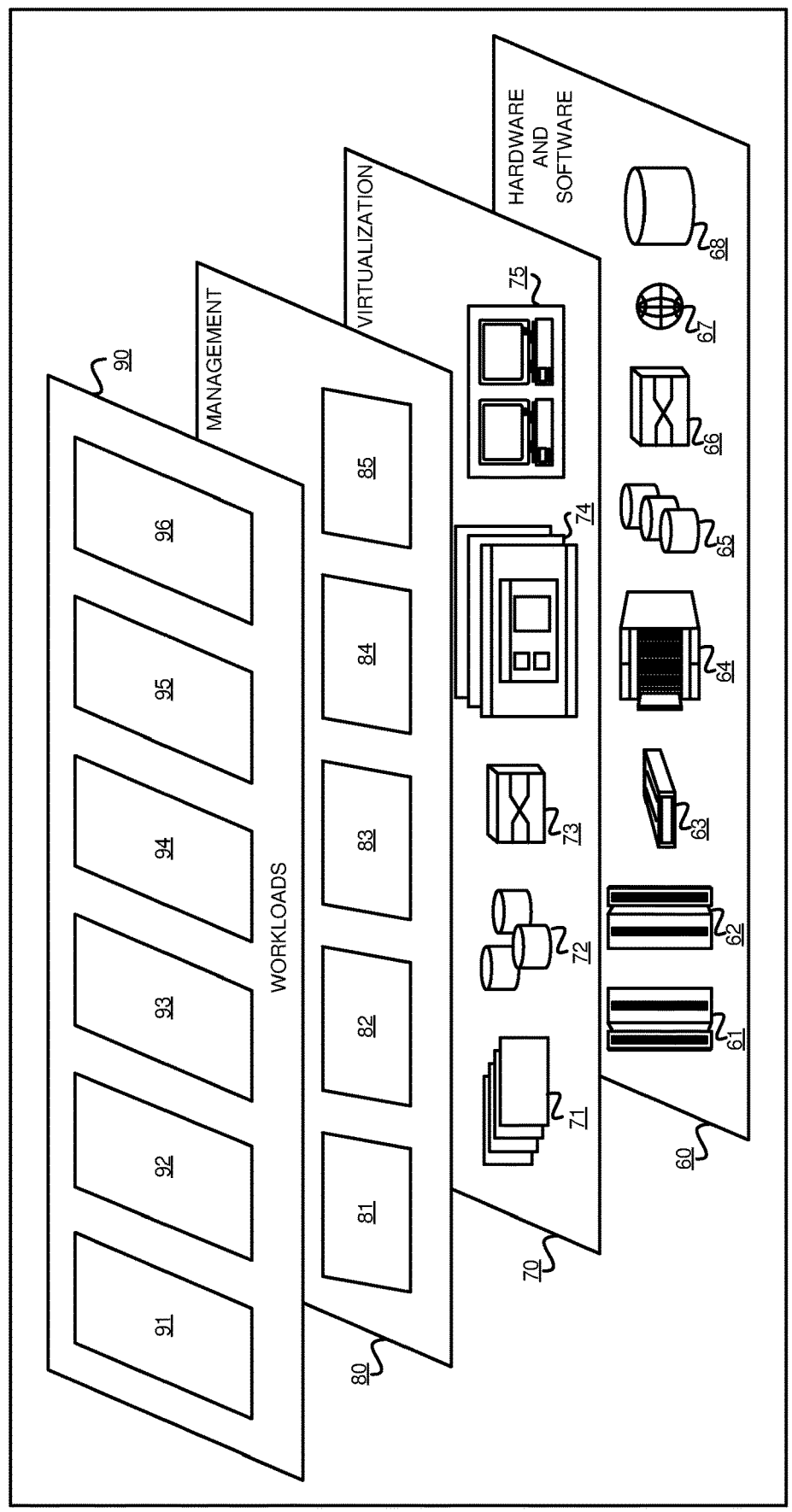
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for throughput-based node sizing and deployment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
measuring a data performance measurement of a shared-nothing architecture of a Hadoop and Hive implementation of a computer system, the data performance measurement including a number of queries performed on data stored in the computer system over a time series, the data performance measurement dividing a total number of queries according to data characteristics including queries to only partitioned data, only bucketed data, both partitioned and bucketed data, and neither partitioned nor bucketed data;
forecasting, by executing a forecasting model, a future value of the data performance measurement on the time series of the computer system;
configuring a set of throughput model input parameters;
computing, by executing a throughput model using the set of throughput model input parameters and the future value of the data performance measurement of the computer system, a throughput requirement for the computer system being sized by computing without utilizing a bloom filter based on adding together throughputs for the queries with the data characteristics, wherein the throughputs are determined by a number of queries for the data characteristics, a size of a Hive dataset of storage devices in a cluster, and a compression percentage;
determining a capacity requirement corresponding to the throughput requirement; and
deploying, according to the capacity requirement, a resource within the computer system.

2. The computer-implemented method of claim 1, wherein the data performance measurement measures a characteristic of data being stored by the computer system.

3. The computer-implemented method of claim 1, wherein the data performance measurement measures a characteristic of a Hive implementation implemented on the computer system and the configured set of throughput model input parameters change a false positive rate of a bloom filter of the Hive implementation.

4. The computer-implemented method of claim 1, wherein the data performance measurement measures a characteristic of a set of queries performed on data being stored by the computer system.

5. The computer-implemented method of claim 1, wherein a throughput model input parameter in the set of throughput model input parameters comprises a performance requirement of the computer system.

6. The computer-implemented method of claim 1, wherein a throughput model input parameter in the set of throughput model input parameters comprises a characteristic of a set of queries performed on data being stored by the computer system.

7. The computer-implemented method of claim 1, wherein a throughput model input parameter in the set of throughput model input parameters comprises a characteristic of a Hive implementation implemented on the computer system.

8. The computer-implemented method of claim 1, wherein the data performance measurement determines an architecture of a Hive implementation implemented on the computer system and the capacity requirement is determined according to the architecture.

9. A computer program product for throughput-based node sizing and deployment, the computer program product comprising:
one or more computer readable storage media, and program instructions collectively stored on the one or more computer readable storage media, the program instructions comprising:
program instructions to measure a data performance measurement of a shared-nothing architecture of a Hadoop and Hive implementation of a computer system over a time series, the data performance measurement including a number of queries performed on data stored in the computer system, the data performance measurement dividing a total number of queries according to data characteristics including queries to only partitioned data, only bucketed data, both partitioned and bucketed data, and neither partitioned nor bucketed data;
program instructions to forecast, by executing a forecasting model, a future value of the data performance measurement of the time series of the computer system;
program instructions to configure a set of throughput model input parameters;
program instructions to compute, by executing a throughput model using the set of throughput model input parameters and the future value of the data performance measurement of the computer system, a throughput requirement for the computer system, the throughput requirement for a Hive implementation of storage devices in a cluster being sized by computing utilizing a bloom filter based on adding together throughputs for the queries with the data characteristics, wherein the throughputs are determined by a number of queries for the data characteristics, a size of a Hive dataset, a number of strides in the Hive dataset, and a bloom filter false positive rate of the Hive implementation;
program instructions to determine a capacity requirement corresponding to the throughput requirement; and
program instructions to deploy, according to the capacity requirement, a resource within the computer system.

10. The computer program product of claim 9, wherein the data performance measurement measures a characteristic of data being stored by the computer system.

11. The computer program product of claim 9, wherein the configured set of throughput model input parameters change the false positive rate of the bloom filter of the Hive implementation.

12. The computer program product of claim 9, wherein the data performance measurement measures a characteristic of a set of queries performed on data being stored by the computer system.

13. The computer program product of claim 9, wherein a throughput model input parameter in the set of throughput model input parameters comprises a performance requirement of the computer system.

14. The computer program product of claim 9, wherein a throughput model input parameter in the set of throughput model input parameters comprises a characteristic of a set of queries performed on data being stored by the computer system.

15. The computer program product of claim 9, wherein a throughput model input parameter in the set of throughput model input parameters comprises a characteristic of the Hive implementation implemented on the computer system.

16. The computer program product of claim 9, wherein the data performance measurement determines an architecture of the Hive implementation implemented on the computer system and the capacity requirement is determined according to the architecture.

17. The computer program product of claim 9, wherein the stored program instructions are stored in the at least one of the one or more storage media of a local data processing system, and wherein the stored program instructions are transferred over a network from a remote data processing system.

18. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 9, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
- program instructions to measure a data performance measurement of a shared-nothing architecture of a Hadoop and Hive implementation of a computer system over a time series, the data performance measurement including a number of queries performed on data stored in the computer system, the data performance measurement dividing a total number of queries according to data characteristics including queries to only partitioned data, only bucketed data, both partitioned and bucketed data, and neither partitioned nor bucketed data;
- program instructions to forecast, by executing a forecasting model, a future value of the data performance measurement of the time series of the computer system;
- program instructions to configure a set of throughput model input parameters;
- program instructions to compute, by executing a throughput model using the set of throughput model input parameters and the future value of the data performance measurement of the computer system, a throughput requirement for the computer system, the throughput requirement for a Hive implementation of storage devices in a cluster being sized by computing without utilizing a bloom filter based on adding together throughputs for the queries with the data characteristics, wherein the throughputs are determined by a number of queries for the data characteristics and a size of a Hive dataset,
- wherein a throughput of the only partitioned data is additionally based on a weighted average of a number of partitions a query runs across, a throughput of the only bucketed data is additionally based on a number of buckets, and a throughput of the both partitioned and bucketed data is additionally based on both the weighted average of the number of partitions the query runs across and the number of buckets;
- program instructions to determine a capacity requirement corresponding to the throughput requirement, the capacity requirement being associated with the Hive implementation being sized for both a shared nothing and a shared storage architecture; and
- program instructions to deploy, according to the capacity requirement, a resource within the computer system.

* * * * *